Sept. 28, 1954  C. W. HANSEN  2,690,042
FEEDING DEVICE FOR FORAGE HARVESTERS
Filed June 30, 1950  2 Sheets-Sheet 1

INVENTOR:
CHARLES W. HANSEN
BY: *Emerson B Donnell*
ATTORNEY

Sept. 28, 1954  C. W. HANSEN  2,690,042
FEEDING DEVICE FOR FORAGE HARVESTERS
Filed June 30, 1950  2 Sheets-Sheet 2

INVENTOR:
CHARLES W. HANSEN
BY:
Emerson B Donnell
ATTORNEY

Patented Sept. 28, 1954

2,690,042

UNITED STATES PATENT OFFICE 2,690,042

FEEDING DEVICE FOR FORAGE HARVESTERS

Charles W. Hansen, Racine, Wis., assignor to J. I. Case Company, Racine, Wis., a corporation of Wisconsin Application June 30, 1950, Serial No. 171,516

4 Claims. (Cl. 56—153)

The present invention relates to forage harvesters or machines for harvesting grass and similar crop material directly from the field and simultaneously cutting the crop material into short lengths suitable for silage, and an object thereof is to generally improve the construction and operation of such devices.

More particularly an object is to improve the feeding of the cut crop material into the comminuting or silage cutting portion of the device.

Machines of this nature are commonly equipped with a cutter bar of substantial length which cuts a swath in the crop several feet in width. This swath must be compressed laterally to the width of the feed opening in the feed cutting portion which is on the order of one-third or one-fourth the width of the swath. These machines are also sometimes used to pick up material which has been previously windrowed and, while the windrow may not be as wide as the swath taken by the cutter bar, the problem is still present since the windrow is much wider than the receiving opening of the silage cutting portion. In the past there has been difficulty in suitably narrowing the stream of material, and various more or less complicated expedients have been used to attempt to successfully accomplish this.

Accordingly further objects are to provide improved mechanism for reducing the width of the stream of material by compressing it edgewise; improved mechanism including rollers having vertical axes at either side of the stream of crop material; such rollers having fixed fingers traveling between the rollers in the direction of crop movement; a pair of strippers cooperating with the fingers and forming a throat-like passageway through which the crop material is forced by the fingers in a relatively narrow stream; and proportions and relations between the fixed fingers and the strippers such that there will be no tendency to pinch the crop material between the fingers and strippers.

Further objects and advantages will become apparent from the following specification and accompanying drawings in which a suitable embodiment of the invention is shown but the invention is not intended to be limited to the specific embodiment disclosed or in fact in any manner except as herein set forth.

Figure 1:
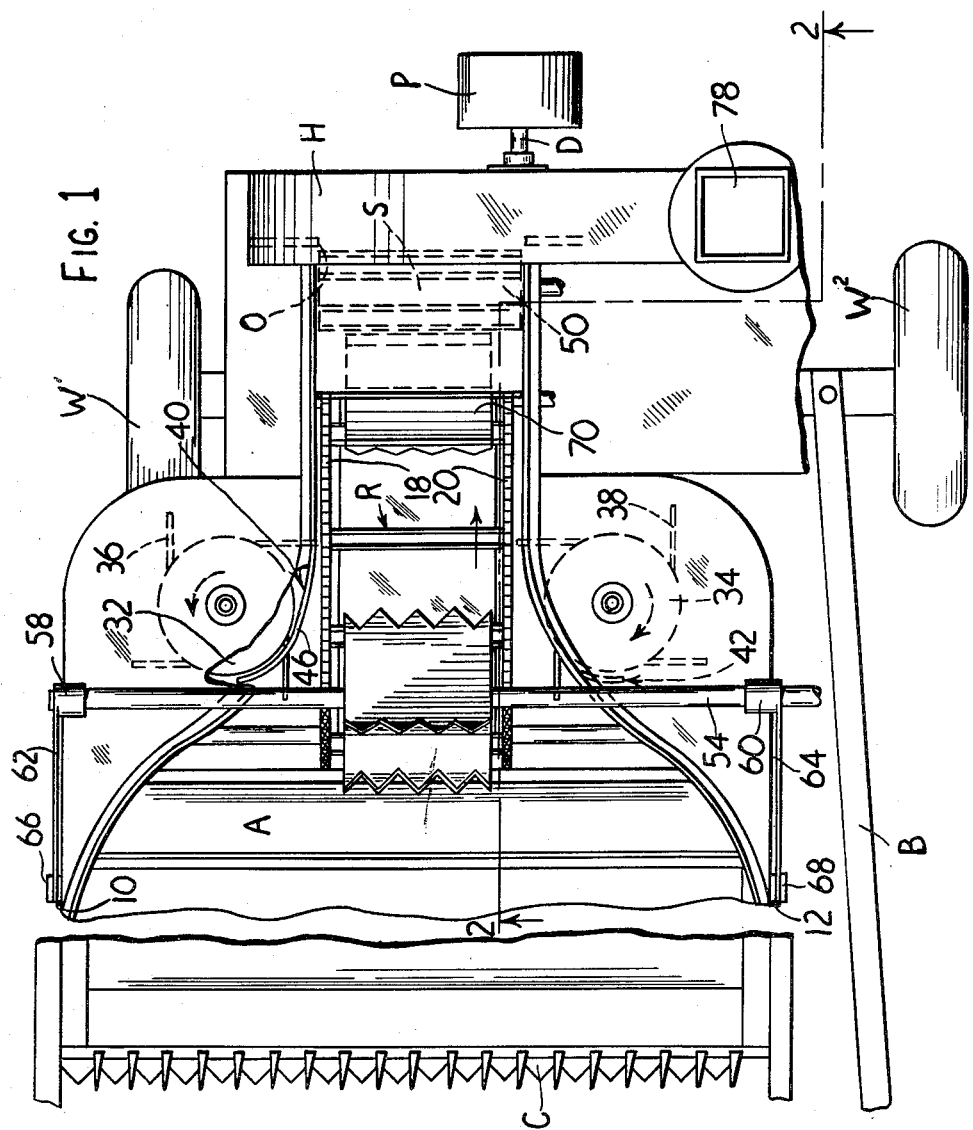

In the drawings, Fig. 1 is a plan view of so much of a forage harvester as necessary to illustrate the invention, with parts omitted and others broken away.

Figure 2:
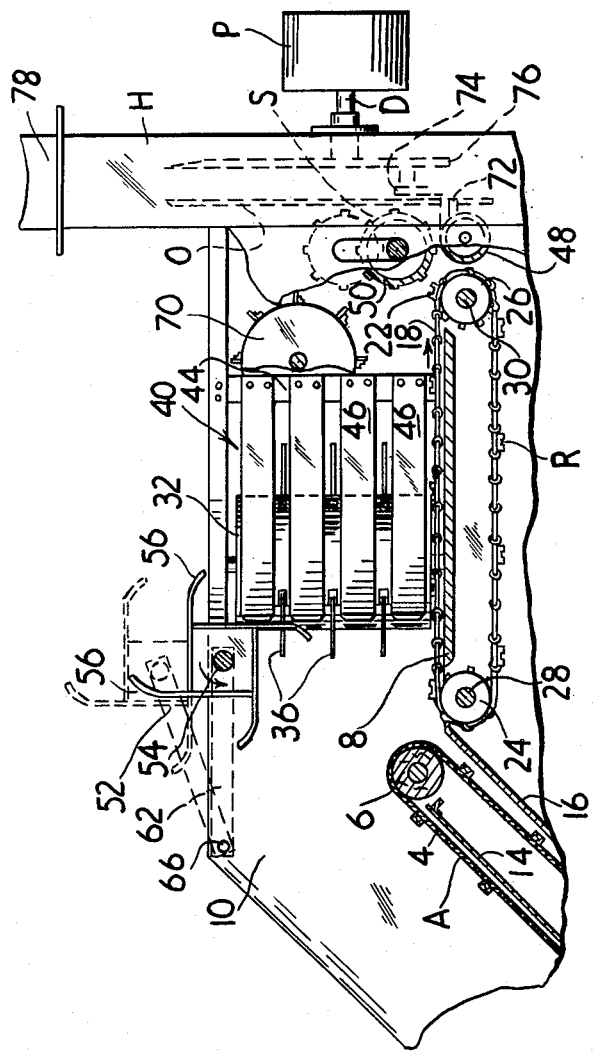

Fig. 2 is a vertical sectional view of the same substantially on the line 2—2 of Fig. 1, with parts omitted and others broken away.

As seen in Fig. 1, the machine comprises generally a cutter bar C for harvesting the crop in the first instance, an apron A for receiving the crop from cutter bar C, a raddle R receiving material from apron A and conducting it to a feed opening O, the usual squeeze rollers being provided for feeding it into the cutting mechanism.

A source of power in the form of a pulley P drives the mechanism through a driving shaft D and it is to be understood that suitable or well-known driving instrumentalities extend from shaft D to the various operative elements, but which are not disclosed since they would only complicate the showing, and also since they do not constitute the invention, suitable drives of this nature being well-known in the art and fully illustrated and described in the patent to Krause 2,385,451, granted September 25, 1945. The cutting mechanism is contained in a housing H and the entire machine is carried on wheels $W^1$ and $W^2$ and propelled by means of a drawbar B.

Returning to a more detailed description of the machine, apron A comprises the usual canvas web 4, Fig. 2, supported on rollers as 6 suitably driven, as will be understood by one skilled in the art, from above mentioned shaft D. Apron A extends rearwardly and upwardly from the vicinity of cutter bar C and terminates substantially at and somewhat above the front margin of a deck 8 supported between side portions 10 and 12 (Fig. 1) and forming a receiving space into which crop material may be discharged from apron A. It will be apparent that this space is substantially the same width as apron A and cutter bar C. A floor 14 is disposed between the runs of apron A and a bottom 16 is arranged beneath the entire assemblage in a manner well-known to those skilled in the art.

Raddle R, Fig. 1, is of a width approximately corresponding to that of opening O and considerably narrower than apron A and it comprises chains 18 and 20 spaced apart and connected at intervals by slats 22. Chains 18 and 20 are carried on sprockets as 24 and 26 in turn supported on shafts 28 and 30, the raddle having an upper run traveling above deck 8 in a direction toward opening O. It is necessary then to narrow, or compress edgewise, the stream of crop material on apron A to the width of raddle R and opening O. For this purpose upright rollers 32 and 34 are provided projecting above deck 8 and spaced on either side of raddle R. Rollers 32 and 34 are preferably in the form of virtually closed cylinders having projecting therefrom at a trailing angle, as compared to the radii of the cylinders, a plurality of rows of fingers 36 and 38. These fingers are nominally fixed in the trailing position shown but are preferably quite resilient so that they can yield in the event of encountering an obstruction and thus avoid damage. The resiliency also assists in avoiding clogging as will appear.

As will now be apparent, rotation of the cylinders or rollers in the direction shown will tend to engage the relatively wide stream of material and compress or narrow it to the width of the space between the cylinders.

A pair of strippers generally designated as 40 and 42 is provided, each comprising header members as 44 and a plurality of tongues as 46—46. As apparent in Fig. 1, tongues 46—46 approach closely to the peripheries of cylinders 32 and 34 at the front or side thereof proximate apron A. They then follow these peripheries inwardly and backwardly for a short distance and then gradually recede from said cylinders so as to approach each other at a gradually diminishing rate and define therebetween a throat-like passageway of approximately the width of raddle R and opening O. Fingers 36 and 38 project into the throat-like passageway between tongues 46—46, first engaging material and urging it inwardly from the deck 6 onto raddle R and then urging it backwardly in conjunction with said raddle toward opening O and squeeze rollers S.

In view of the trailing position of fingers 36 and 38, and the curvature of tongues 46—46, the fingers, without resorting to other mechanism, will in effect gradually recede behind strippers 40 and 42 so as to clear the stream of material for further movement toward opening O. Furthermore because of the angle of fingers 36 and 38 and the above mentioned curvature, the angle between said fingers and said strippers on the crop engaging side of said fingers will at all times be 90° or over so that crop material will not be pinched between tongues 46—46 and fingers 36 or 38. In this way, a relatively simple mechanism is provided for rearwardly propelling and at the same time compressing the crop material.

Because of the resiliency of fingers 36 and 38, they can yield, in the event that the slot between any two tongues 46—46 becomes clogged, so that the rotation of the rollers 32 and 34 will not be prevented. Additionally, the constant whipping of the obstruction by the successively passing fingers will be very likely to promptly dislodge the obstruction.

As well as compressing the stream of material edgewise as hereinbefore described, it is necessary to reduce it in depth to an extent sufficient to be operated on by squeeze rolls S. The latter comprise in the present instance a lower smooth roll 48 and an upper roughened roll 50, the rolls being rotated and roll 50 being pressed downwardly against roll 48 in a manner well-known in the art.

Material coming up apron A may be of substantial depth and it is acted upon by a downbeater generally designated as 52 fixed on a rotating shaft 54 and having wing portions 56—56 traversing in part the throat-like space between strippers 40 and 42. Shaft 54 is carried in suitable bearings 58 and 60 carried respectively on links 62 and 64 pivoted at 66 and 68 to side portions 10 and 12, shaft 54 reposing in suitable slots, not shown, formed in sides 10 and 12. However in the event of large volumes of crop material being presented by apron A, beater 52 will tend to climb on such material, compressing it downwardly and urging it backwardly into the throat-like space between strippers 40 and 42. In the event that the amount of material is excessive, beater 52 may rise as indicated in dotted lines so that excessive compressing action will not be accomplished.

Material downwardly compressed to the extent provided by beater 52 is carried backwardly, as above described by fingers 36 and 38 in conjunction with raddle R, and is further downwardly compressed by a beater and compressing roll 70 to a thickness to be readily engaged by squeeze roll 50 and propelled between it and roll 48 into housing H.

Within housing H the material feeds over an abutment bar 72 and is cut by a plurality of knives as 74 fixed on a rotating plate or wheel 76 carried on and rotated by above mentioned driving shaft D. After being cut, the material is thrown out of housing H through an outlet 78 and disposed of in a wagon or the like, not shown, in a manner well-known in the art.

The operation of the mechanism is thought to be clear from the foregoing description, it being apparent that the relatively bulky stream of material coming up apron A is readily and effectively compressed downwardly by beaters 52 and 70 and inwardly by fingers 36 and 38 operating in conjunction with strippers 40 and 42 so as to be reduced to substantially the width of raddle R and also to a thickness which can readily be handled by squeeze rolls S.

The above being a complete description of an illustrative embodiment of the invention what is claimed as new and desired to be secured by Letters Patent of the United States is:

1. In a feeding means for a forage harvester having a relatively narrow crop receiving opening the combination of a relatively wide upwardly and rearwardly inclined feeding apron leading toward said opening, a substantially horizontal deck leading from a point below the upper end of said upwardly inclined apron towards said opening, a raddle on said deck leading from said apron to said opening of a width substantially corresponding to the width of said opening and movable toward said opening, feed rollers on said deck projecting upwardly therefrom disposed at either side of said raddle and having nominally fixed fingers projecting from the rollers, said rollers being rotatable so as to cause said fingers to traverse the space between said rollers in a direction toward said opening, and a pair of opposed slotted strippers disposed in said space and extending substantially from said rollers to said opening, and through which said fingers project, said strippers extending from a point substantially in contact with said rollers on the side of said rollers presented toward said apron and receding from said rollers and approaching each other at a gradually diminishing rate to form a crop compressing throat, and a beater wheel journaled above said strippers and having a portion extending downwardly between them and rotatable to urge crop material in the same direction as said apron, raddle and fingers.

2. In a feeding means for a forage harvester having a relatively narrow crop receiving opening the combination of an upwardly and rearwardly inclined apron substantially wider than said opening and leading toward said opening, a substantially horizontal deck leading from a point below the upper end of said upwardly inclined apron towards said opening, a raddle on said deck leading from said apron to said opening of a width substantially corresponding to the width of said opening and movable toward said opening, feed rollers on said deck projecting upwardly therefrom disposed at either side of said raddle and having nominally fixed fingers projecting from the rollers, said rollers being rotatable so as to cause said fingers to traverse the space between said rollers in a direction toward said opening, and a pair of opposed slotted strippers disposed in said space and extending substantially from said rollers to said opening and through which said fingers project, said strippers extending from a point substantially in contact with said rollers from the side of said rollers presented toward said apron and receding from said rollers and approaching each other at a gradually diminishing rate to form a crop compressing throat-like passageway, said fingers being angled in a trailing direction as related to the direction of rotation of said rollers so as to make, with said curved strippers at all times an angle of at least 90° on the crop engaging sides of said fingers.

3. In a feeding means for a forage harvester having a relatively narrow crop receiving opening the combination of a cutter bar, an upwardly and rearwardly inclined apron of a width substantially corresponding to the width of said cutter bar, said apron being substantially wider than said opening and leading from said cutter bar toward said opening, a substantially horizontal deck leading from a point below the upper end of said upwardly inclined apron towards said opening and of a width substantially corresponding to said apron, a raddle on said deck of a width substantially corresponding to the width of said opening leading from said apron to said opening, upstanding feed rollers disposed on said deck at either side of said raddle and having nominally fixed fingers projecting from the rollers, said rollers being rotatable so as to cause said fingers to traverse the space between said rollers in a direction toward said opening, and a pair of opposed slotted strippers disposed in said space and extending substantially from said rollers to said opening, and through which said fingers project into the space between said strippers, said strippers extending from a point substantially in contact with said rollers from the side of said rollers presented toward said apron and receding from said rollers and approaching each other at a gradually diminishing rate to form a crop compressing throat-like passageway, and a beater wheel journaled above said strippers and having a portion extending downwardly between said strippers and between said rollers and rotatable to urge crop material in the same direction as said apron, raddle and fingers.

4. In a feeding means for a forage harvester having a relatively narrow crop receiving opening the combination of an upwardly and rearwardly inclined apron of a width substantially greater than and leading toward said opening, a substantially horizontal deck leading from a point below the upper end of said upwardly inclined apron towards said opening, a raddle on said deck of a width substantially corresponding to the width of said opening leading from said apron to said opening, upstanding feed rollers disposed on said deck at either side of said raddle and having nominally fixed fingers projecting from the rollers, said rollers being rotatable so as to cause said fingers to traverse the space between said rollers in a direction toward said opening, and a pair of opposed slotted strippers disposed in said space and extending substantially from said rollers to said opening, and through which said fingers project into said space, said strippers extending from a point substantially in contact with said rollers from the side of said rollers presented toward said apron and receding from said rollers and approaching each other at a gradually diminishing rate to form a crop compressing throat-like passageway, a beater wheel journaled above said strippers and having a portion extending downwardly between them and between said rollers and rotatable to urge crop material in the same direction as said apron, raddle and fingers, and floating supporting means for said beater wheel providing for rising thereof in response to upward pressure of crop material passing in volume through said throat-like passageway.

References Cited in the file of this patent

UNITED STATES PATENTS

| Number | Name | Date |
|---|---|---|
| 17,223 | Kellogg | May 5, 1857 |
| 1,758,557 | Bullock | May 13, 1930 |
| 2,157,261 | Innes | May 9, 1939 |
| 2,385,451 | Krause et al. | Sept. 25, 1945 |
| 2,439,259 | McCormack | Apr. 6, 1948 |
| 2,455,906 | Ronning et al. | Dec. 7, 1948 |
| 2,477,795 | Gehl | Aug. 2, 1949 |
| 2,507,540 | Nolt | May 16, 1950 |
| 2,545,188 | Baskerville | Mar. 13, 1951 |